United States Patent [19]

Schnabel et al.

[11] 3,714,216

[45] Jan. 30, 1973

[54] PROCESS FOR PREPARING AROMATIC ISOCYANATES

[75] Inventors: Wilhelm J. Schnabel, Branford; Ehrenfried H. Kober, Hamden; Theodore C. Kraus, Cheshire, all of Conn.

[73] Assignee: Olin Mathieson Chemical Corporation

[22] Filed: Feb. 28, 1967

[21] Appl. No.: 619,158

[52] U.S. Cl..............260/453 PC, 252/441, 252/470, 252/472
[51] Int. Cl............................................C07c 119/04
[58] Field of Search.....................260/453 A, 453 PC

[56] References Cited

FOREIGN PATENTS OR APPLICATIONS 672,405   5/1966   Belgium

OTHER PUBLICATIONS

Olah; Friedel-Crafts and Related Reactions, Volume I, Pages 310-312; 329-330 relied upon, 1963, Interscience Publishers, New York.

*Primary Examiner*—Lewis Gotts
*Assistant Examiner*—Dolph H. Torrence
*Attorney*—Gordon D. Byrkit, Donald F. Clements, Walter D. Hunter, Thomas P. O'Day, Ellen P. Trevors, Arthur N. Krein, Richard S. Strickler and George J. Koeser

[57] ABSTRACT

The process for preparing an organic isocyanate by reacting an organic nitro compound with carbon monoxide in the presence of a catalytic system comprised of a mixture of at least one compound selected from the group consisting of palladium halides, rhodium halides, palladium oxides, and rhodium oxides, with at least one oxide of an element selected from the group consisting of vanadium, molybdenum, tungsten, niobium, chromium, and tantalum.

12 Claims, No Drawings

PROCESS FOR PREPARING AROMATIC ISOCYANATES

This invention relates to the preparation of organic isocyanates from organic nitro compounds.

Organic isocyanates are used extensively in the preparation of urethane foams, coatings, and fibers, as well as in the preparation of insecticides, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially because no more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride and the like.

Other proposed simplified techniques utilize other catalyst systems. For example, Belgium Pat. No. 672,405, entitled "Process For The Preparation Of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

It is a primary object of this invention to provide an improved process for the preparation of organic isocyanates.

Another object of the invention is to provide a novel catalyst system useful in the direct conversion of organic nitro compounds to the corresponding organic isocyanates.

Still a further object is to provide an improved process for preparing phenyl isocyanate.

It is another object of the invention to provide an improved process for preparing toluene diisocyanates.

Another object of the invention is to provide an improved process for preparing isocyanato-nitrotoluenes.

These and other objects of the invention will be apparent from the following detailed description thereof.

It has now been discovered that the above-mentioned objects are accomplished when an organic nitro compound is reacted with carbon monoxide at an elevated pressure and elevated temperature in the presence of a catalyst system comprised of a mixture of at least one compound selected from the group consisting of palladium halides, rhodium halides, palladium oxides and rhodium oxides, with at least one oxide of an element selected from the group consisting of vanadium, molybdenum, tungsten, niobium, chromium and tantalum.

Any organic nitro compound capable of being converted to an organic isocyanate may be employed as a reactant. Generally, aromatic, cycloaliphatic, and aliphatic mono- or poly-nitro compounds which may be substituted, if desired, can be reacted to form the corresponding mono- or poly-isocyanates by the novel process of this invention. The term "organic nitro compound," is used throughout the description and claims to define unsubstituted as well as substituted organic nitro compounds of the type described herein. Typical examples of suitable organic nitro compounds which can be reacted to form isocyanates include the following:

I. Aromatic Nitro Compounds a. Nitrobenzene
b. Nitronaphthalenes
c. Nitroanthracenes
d. Nitrobiphenyls
e. Bis(nitrophenyl)methanes
f. Bis(nitrophenyl)ethers
g. Bis(nitrophenyl)thioether
h. Bis(nitrophenyl)sulfones
i. Nitrodiphenoxy alkanes
j. Nitrophenothiazines II. Nitrocycloalkanes a. Nitrocyclobutane
b. Nitrocyclopentane
c. Nitrocyclohexane
d. Dinitrocyclohexanes
e. Bis(nitrocyclohexyl)methanes III. Nitroalkanes a. Nitromethane
b. Nitroethane
c. Nitropropane
d. Nitrobutanes
e. Nitrohexanes
f. Nitrooctanes
g. Nitrooctadecanes
h. Dinitroethane
i. Dinitropropanes
j. Dinitrobutanes
k. Dinitrohexanes
l. Dinitrodecanes
m. Phenyl nitromethane
n. Bromophenyl nitromethanes
o. Nitrophenyl nitromethanes
p. Methoxy phenyl nitromethanes q. Bis-(nitromethyl)cyclohexanes r. Bis-(nitromethyl)benzenes All of the aforementioned compounds may be substituted with one or more additional substituents such as nitro, nitro-alkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-organic nitro compounds which can be used are as follows:

1. o-Nitrotoluene
2. m-Nitrotoluene
3. p-Nitrotoluene
4. o-Nitro-p-xylene
5. 2-Methyl-1-nitronaphthalene
6. m-Dinitrobenzene
7. p-Dinitrobenzene
8. 2,4-Dinitrotoluene
9. 2,6-Dinitrotoluene
10. Dinitromesitylene
11. 4,4'-Dinitrobiphenyl
12. 2,4-Dinitrobiphenyl
13. 4,4'-Dinitrobibenzyl
14. Bis(p-nitrophenyl)methane
15. Bis(2,4-dinitrophenyl)methane
16. Bis(p-nitrophenyl)ether
17. Bis(2,4-dinitrophenyl)ether
18. Bis(p-nitrophenyl)thioether
19. Bis(p-nitrophenyl)sulfone
20. Bis(p-nitrophenoxy)ethane
21. $\alpha,\alpha'$-Dinitro-p-xylene
22. 2,4,6-Trinitrotoluene
23. 1,3,5-Trinitrobenzene
24. 1-Chloro-2-nitrobenzene
25. 1-Chloro-4-nitrobenzene
26. 1-Chloro-3-nitrobenzene
27. 2-Chloro-6-nitrotoluene
28. 4-Chloro-3-nitrotoluene
29. 1-Chloro-2,4-dinitrobenzene
30. 1,4-Dichloro-2-nitrobenzene
31. alpha-Chloro-p-nitrotoluene
32. 1,3,5-Trichloro-2-nitrobenzene
33. 1,3,5-Trichloro-2,4-dinitrobenzene
34. 1,2-Dichloro-4-nitrobenzene
35. alpha-Chloro-m-nitrotoluene
36. 1,2,4-Trichloro-5-nitrobenzene
37. 1-Bromo-4-nitrobenzene
38. 1-Bromo-2-nitrobenzene
39. 1-Bromo-3-nitrobenzene
40. 1-Bromo-2,4-dinitrobenzene
41. $\alpha,\alpha$-Dibromo-p-nitrotoluene
42. $\alpha$-Bromo-p-nitrotoluene
43. 1-Fluoro-4-nitrobenzene
44. 1-Fluoro-2,4-dinitrobenzene
45. 1-Fluoro-2-nitrobenzene
46. o-Nitrophenyl isocyanate
47. m-Nitrophenyl isocyanate
48. p-Nitrophenyl isocyanate
49. o-Nitroanisole
50. p-Nitroanisole
51. p-Nitrophenetole
52. o-Nitrophenetole
53. 2,4-Dinitrophenetole
54. 2,4-Dinitroanisole
55. 1-Chloro-2,4-dimethoxy-5-nitrobenzene
56. 1,4-Dimethoxy-2-nitrobenzene
57. m-Nitrobenzaldehyde
58. p-Nitrobenzaldehyde
59. p-Nitrobenzoylchloride
60. m-Nitrobenzoylchloride
61. 3,5-Dinitrobenzoylchloride
62. Ethyl-p-nitrobenzoate
63. Methyl-o-nitrobenzoate
64. m-Nitrobenzenesulfonylchloride
65. p-Nitrobenzenesulfonylchloride
66. o-Nitrobenzenesulfonylchloride
67. 4-Chloro-3-nitrobenzenesulfonylchloride
68. 2,4-Dinitrobenzenesulfonylchloride
69. 3-Nitrophthalic anhydride
70. p-Nitrobenzonitrile
71. m-Nitrobenzonitrile
72. 1,4-Dinitrocyclohexane
73. Bis(p-nitrocyclohexyl)methane
74. 1-Nitro-n-hexane
75. 2,2-Dimethyl-1-nitrobutane
76. 1,6-Dinitro-n-hexane
77. 1,4-Bis(nitromethyl)cyclohexane
78. 3,3'-Dimethoxy-4,4'-dinitro-biphenyl
79. 3,3'-Dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyanato-4-nitrotoluene, may also be employed as a reactant. Aromatic nitro compounds are preferably employed as a reactant because the novel catalyst system of this invention appears to be more effective for these compounds. Generally, the organic nitro compounds and substitued organic nitro compounds contain between one and about 20 and preferably between about one and about 14 carbon atoms.

As indicated above, the catalyst system of this invention is a mixture of at least one compound selected from the group consisting of palladium halides, rhodium halides, palladium oxides and rhodium oxides, with at least one oxide of an element selected from the group consisting of vanadium, molybdenum, tungsten, niobium, chromium and tantalum. Palladium halides include palladium bromide, palladium chloride, palladium fluoride, and palladium iodide. Rhodium halides include rhodium bromide, rhodium chloride, rhodium fluoride, and rhodium iodide. Palladium oxides include palladium suboxide ($Pd_2O$), palladium monoxide (PdO), and palladium dioxide ($PdO_2$). Rhodium oxides include rhodium monoxide (RhO), rhodium sesquioxide ($Rh_2O_3$), and rhodium dioxide ($RhO_2$). At least one of these halides or oxides or palladium or rhodium is used as a component of the mixture used as the catalyst system, but mixtures of one or more halides and one or more oxides may be employed as one component of the catalyst mixture.

The other component of the catalyst mixture is at least one oxide of an element selected from a group consisting of vanadium, molybdenum, tungsten, niobium, chromium, and tantalum. The elements are found in Group VB and VIB of the Periodic Table. Suitable oxides of this type include chromic oxide ($Cr_2O_3$), chromium dioxide ($CrO_2$), and chromous oxide (CrO);

molybdenum sesquioxide ($Mo_2O_3$), molybdenum dioxide ($MoO_2$), and molybdenum trioxide ($MoO_3$); niobium monoxide (NbO), niobium oxide ($NbO_2$), and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$) and vanadium pentoxide ($V_2O_5$). Mixtures of two or more of these oxides may be employed as one component of the catalyst mixture.

Although all of the foresaid catalyst systems have some effect upon increasing the yield of organic isocyanates, certain systems are significantly more effective than others. Included in these more effective systems are the following:

1. Palladium chloride and vanadium pentoxide
2. Palladium chloride and molybdenum dioxide
3. Rhodium trichloride and vanadium pentoxide
4. Rhodium trichloride and molybdenum dioxide
5. Palladium chloride, rhodium trichloride and vanadium pentoxide.

The catalyst system can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

The reaction is carried out in the presence of a catalytic proportion of the catalyst system. The proportion of catalyst system is generally equivalent to between about 0.1 and about 100 percent, and preferably between about 1 and about 60 percent by weight of the organic nitro compound. However, greater or lesser proportions may be employed if desired.

The weight ratio of palladium or rhodium compound to oxide of the Group VB or VIB metals in the catalyst system is generally in the range between about 0.001:1 and about 25:1, and preferably in the range between about 0.05:1 and about 10:1.

The process of this invention operates effectively in the absence of a solvent, but improved overall yields of the organic isocyanates can be obtained when a solvent which is chemically inert to the components of the reaction system is employed. Suitable solvents include halogenated aliphatic and aromatic hydrocarbons such as dichloromethane, tetrachloroethane, monochloronaphthalene, monochlorobenzene, dichlorobenzene,α-chloronaphthalene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent is in the range between about 5.0 and about 75 percent, but greater or lesser proportions may be employed if desired.

The order of mixing the reactants is not critical and may be varied within the limitations of the equipment employed. In one embodiment, the organic nitro compound, catalyst system, and, if desired, solvent, is charged to a suitable pressure vessel such as an autoclave which was previously purged with nitrogen, and which is preferably provided with agitation means such as a stirrer, or an external rocking mechanism. Carbon monoxide is fed into the autoclave until a pressure is attained which is in the range between about 30 and about 10,000 psig, and preferably between about 100 and about 8,000 psig, but greater or lesser pressures may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

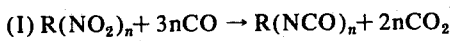

$$(I) \quad R(NO_2)_n + 3nCO \rightarrow R(NCO)_n + 2nCO_2$$

where R is the organic moiety of the organic nitro compound reactant of the type defined above, and n is the number of nitro groups in the organic nitro compound. From Formula I, it can be seen that when R is aromatic, sufficient carbon monoxide is present to provide at least 3 moles of carbon monoxide per mole of nitro groups reacted in said aromatic nitro compound. The total amount of carbon monoxide added during the reaction is generally between about 3 and about 50, and preferably between about 8 and about 15 moles of carbon monoxide per mole of nitro group in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is maintained above about 25°C and preferably between about 100° and about 250°C. Interior and/or exterior heating and cooling means may be employed to maintain the temperature within the reactor within the desired range.

The reaction time is dependent upon the organic nitro compound being reacted, and on the amount of catalyst being charged, as well as the type of equipment being employed. Usually between one-half hour and 20 hours are required to obtain the desired degree of reaction, but shorter or longer reaction times may be employed.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation technique may be employed to separate the catalyst from the reaction product, the fractional distillation is preferably employed to isolate the organic isocyanate from the reaction product. However, other suitable separation techniques such as extraction, sublimation, etc., may be employed to separate the organic isocyanate from the unreacted organic nitro compound and any by-products that may be formed.

Organic isocyanates produced in accordance with the technique of this invention are suitable for use in preparing urethane compounds such as foams, coatings, fibers, and the like by reacting the organic isocyanate with a suitable polyether polyol in the presence of a catalyst and, if desired, a foaming agent, and as intermediates for biologically active compounds.

The following examples are presented to further illustrate the invention without any intention of being limited thereby. All parts and percentages are by weight unless otherwise specified.

EXAMPLE 1

A rocking 316 stainless steel autoclave having a volume of 103 ml. was charged with 6.0 g. (0.049 mole) of nitrobenzene in 5 ml. of chlorobenzene, 0.18 g. (1.0 × $10^{-3}$ mole) of palladous chloride, and 0.36 g. (2.0 × $10^{-3}$ mole) of vanadium pentoxide. The reactor was closed, purged, and then pressurized with carbon monoxide to 1850 psi. The reaction mixture was heated to 190°C and kept at this temperature for 1.5 hours. After cooling to room temperature, the autoclave was vented and the reaction mixture was filtered. A vapor phase chromatography analysis of a portion of the weighed filtrate indicated that a corrected yield of phenyl isocyanate of 56.0 percent, based on a nitrobenzene conversion of 94.5 percent, was obtained.

EXAMPLE 2

A quantity of 6.0 g. (0.049 mole) of nitrobenzene in 5 ml. of orthodichlorobenzene was reacted with carbon monoxide at an initial pressure of 2180 psi. in the presence of 0.18 g. (8.6 × $10^{-4}$ mole) of rhodium chloride and 0.12 g. (6.6 × $10^{-4}$ mole) of vanadium pentoxide for 1.5 hours at 190°C as described in Example 1. An analysis of the filtrate by vapor phase chromatography showed that the reaction afforded a 71.1 percent corrected yield of phenylisocyanate, based on a 93.3 percent conversion of nitrobenzene.

EXAMPLE 3

A 103 ml. rocking autoclave filled with a glass insert was charged with 6.0 g. (0.049 mole) of nitrobenzene, 0.12 g. (6.8 × $10^{-4}$ mole) of palladous chloride, and 0.12 g. (9.4 × $10^{-4}$ mole) of molybdenum dioxide. The reactor was closed, purged, and then pressurized with carbon monoxide to 2,780 psi. The reaction mixture was heated to 190°C and kept at this temperature for 3.0 hours. An analysis of the filtrate as described in Example 1 showed that this system produced a 50.4 percent corrected yield of phenyl isocyanate, based on a 95.3 percent conversion of nitrobenzene.

EXAMPLE 4

A quantity of 6.0 g. (0.049 mole) of nitrobenzene was reacted with carbon monoxide at an initial pressure of 4,990 psi. in the presence of 0.18 g. (8.6 × $10^{-4}$ mole) of rhodium chloride and 0.18 g. (1.4 × $10^{-3}$ mole) of molybdenum dioxide for 1.5 hours at 190°C as described in Example 1. On the basis of vapor phase chromatography analysis the reaction afforded phenylisocyanate in a corrected yield of 50.7 percent, based on a 89.7 percent conversion of nitrobenzene.

EXAMPLE 5

An amount of 6.0 g. (0.049 mole) of nitrobenzene was reacted with carbon monoxide at an initial pressure of 5,070 psi. in the presence of 0.18 g. (1.3 × $10^{-3}$ moles) of palladium dioxide and 0.18 g. (1.0 × $10^{-3}$ mole) of vanadium pentoxide for 1.5 hours at 190°C as described in Example 1. A vapor phase chromatography analysis of the filtrate indicated that the reaction produced a 69.5 percent corrected yield of phenyl isocyanate, based on a nitrobenzene conversion of 32.3 percent.

EXAMPLE 6

Nitrobenzene (0.05 mole) was added to the autoclave of Example 3 along with 3 percent rhodium trichloride, 3 percent vanadium pentoxide and 3 percent molybdenum dioxide. The pressure ranged from 1,925 to 2,875 psi. over the 1.5 hour reaction period, and the temperature was 190°C. The reaction produced a corrected yield of 51 percent phenyl isocyanate based on a nitrobenzene conversion of 75 percent.

For purposes of comparison the above procedure was repeated except that the catalyst system was a mixture of 3 percent palladous chloride and 3 percent rhodium trichloride, and the reaction was carried in 5 milliliters of orthodichlorobenzene solvent. The reaction resulted in the conversion of 17 percent of the nitrobenzene to unknown compounds, with no detectable amount of isocyanate being formed.

EXAMPLES 7–18

The procedure of Example 1 was repeated, utilizing nitrobenzene (0.05 moles) as the starting material. In each example, the reaction temperature was 190°C and the reaction time was 90 minutes. The proportions, catalyst, pressure range, are set forth below in the table. The table also shows the percent conversion and the percent corrected yield of phenyl isocyanate.

| Example No. | Catalyst, percent | Catalyst, percent | Catalyst, percent | Pressure range, p.s.i.g. | Conversion, percent | Yield, percent |
|---|---|---|---|---|---|---|
| 7 | $PdCl_2$, 1.0 | $V_2O_5$, 6.0 | $Cr_2O_3$, 3.0 | 1,400–2,000 | 60 | 42 |
| 8 | $PdCl_2$, 1.0 | $V_2O_5$, 6.0 | $WO_3$, 3.0 | 1,490–2,120 | 54 | 42 |
| 9 a | $RhCl_3$, 3.0 | $WO_3$, 3.0 | | 2,520–3,890 | 19 | 52 |
| 10 a | $PdCl_2$, 3.0 | $Nb_2O_5$, 3.0 | | 1,450–2,175 | 25 | 61 |
| 11 | $RhCl_3$, 3.0 | $Nb_2O_5$, 3.0 | | 2,240–3,690 | 33 | 70 |
| 12 | $PdBr_2$, 4.33 | $V_2O_5$, 6.0 | | 2,550–4,065 | 39 | 56 |
| 13 | $PdCl_2$, 1.0 | $V_2O_5$, 6.0 | $Ta_2O_5$, 1.0 | 1,500–2,100 | 40 | 42 |
| 14 | $PdCl_2$, 1.0 | $MoO_2$, 6.0 | $Ta_2O_5$, 1.0 | 1,475–2,165 | 32 | 39 |
| 15 | $RhCl_3$, 1.0 | $V_2O_5$, 6.0 | $Ta_2O_5$, 1.0 | 1,185–2,160 | 45 | 35 |
| 16 | $RhCl_3$, 1.0 | $V_2O_5$, 1.3 b | | 1,100–1,650 | 49 | 44 |
| 17 a | $RhCl_3$, 3.0 | $V_2O_5$, 2.0 c | | 2,200–3,220 | 75 | 43 |
| 18 | $PdCl_2$, 1.0 | $V_2O_3$, 6.0 | | 1,235–1,800 | 38 | 41 | a Reaction carried out in ortho-dichlorobenzene solvent.
b Based on $V_2O_5$ content of aluminum silicate impregnated with 5% $V_2O_5$.
c Based on $V_2O_5$ content of silica impregnated with 10% $V_2O_5$.

EXAMPLE 19

A 300 milliliter stainless steel autoclave provided with a mechanically driven agitator, internal cooling coil, an external heating mantle, and a gas sparger for feeding carbon monoxide into the bottom of the autoclave was employed in this example. Dinitrotoluene (50 grams), monochlorobenzene (50 grams), palladium chloride (3 grams) and vanadium pentoxide (2 grams) were charged to the autoclave. The autoclave and auxiliary equipment were assembled, the agitator was started, and heat was applied to raise the internal temperature within the range between 160° and 170°C. Carbon monoxide was fed through the sparger at a rate between 500 and 1,000 cc per minute, while maintaining a carbon monoxide pressure of about 500 psig. After 4 hours and 20 minutes, the flow of carbon monoxide was stopped, the reaction mixture was cooled by passing cooling water through the internal coils, and the pressure was released from the vessel. Analysis of the reaction product showed a conversion of 29.6 percent, and a corrected yield of 0.73 percent toluene diisocyanate, 2.9 percent of 2-nitro,4-isocyanato toluene, and 68.8 percent 4-nitro,2-isocyanato toluene.

EXAMPLE 20

The procedure of Example 19 was repeated with the following exceptions. The charge to the autoclave was dinitrotoluene (50 grams), orthodichlorobenzene (120 grams), palladium chloride (5 grams), rhodium trichloride (5 grams), and vanadium pentoxide (15 grams). The reaction was carried out at a temperature of 184°C and a pressure of 1000 psig, with a feed rate of carbon monoxide of 1,000 cc per minute. The reaction time was 8 hours and 45 minutes. Analysis of the reaction product showed a conversion of 94.5 percent, with a corrected yield of toluene diisocyanate of 42.9 percent, of 2-nitro,4-isocyanato toluene of 10.7 percent, and of 4-nitro,2-isocyanato toluene of 47.6 percent.

EXAMPLE 21

The procedure of Example 1 was repeated, employing the following ingredients in the following proportions:

| Ingredients | Proportions |
| --- | --- |
| Dinitrotoluene | 0.05 moles |
| Rhodium Trichloride | 4 percent |
| Palladium Chloride | 2 percent |
| Vanadium Pentoxide | 2 percent |
| Monochlorobenzene | 5 milliliters |

The reaction was carried out over a period of 3 hours at a temperature of 190°C at a carbon monoxide pressure ranging from 2,490 to 3,800 psig.

Analysis of the product showed a conversion of 23.7 percent, the corrected yield of toluene diisocyanate being 7.9 percent, of 2-isocyanato,4-nitro toluene 60.4 percent, and of 4-isocyanato,2-nitro toluene 27.7 percent.

EXAMPLE 22

A 300 milliliter stainless steel autoclave provided with a mechanically driven agitator, internal cooling coils, and an external heating mantle was employed in this example. A solution of 2-isocyanato,4-nitrotoluene (25 grams) in orthodichlorobenzene (70 grams) was added to the autoclave along with palladium chloride (12 percent) and vanadium pentoxide (12 percent). Sufficient carbon monoxide was added to the reactor to maintain the pressure during the 1.5 hour reaction period within the range between 1,000 and 1,600 psig. The reaction temperature was maintained at 190°C and the initial ratio of CO to $NO_2$ was approximately 5:1. Analysis of the reaction product showed a corrected yield of toluene diisocyanate of 36 percent and a conversion of 52 percent.

COMPARATIVE EXAMPLES A–F

The procedure of Examples 7–18 was repeated with the exception that the catalyst system employed was comprised of a noble metal compound and a Lewis acid. The proportions, catalyst, pressure range, percent conversion and percent corrected yield of phenyl isocyanate are set forth below in the table.

| EX. | Catalyst % | Catalyst % | Pressure range psig | Conversion % | Yield, % |
| --- | --- | --- | --- | --- | --- |
| A | $PdO_2$,1 | $SbCl_3$,6 | 1450–2080 | ND | 0 |
| B | $PdCl_2$,1 | $SbCl_3$,6 | 1490–2100 | ND | 0 |
| C | $RhCl_3$,1 | $SbCl_3$,6 | 1350–1920 | ND | 0 |
| D | $PdCl_2$,1 | $SbF_3$,6 | 1400–2000 | ND | 0 |
| E | $PdCl_2$,1 | $AsCl_3$,6 | 1190–1700 | ND | 0 |
| F | $RhCl_3$,1 | $AsCl_3$,6 | 1270–1800 | 6.5 | 8 |

ND-Not Determined

These comparative Examples demonstrate that when Lewis acids such as antimony trichloride, antimony trifluoride and arsenous chloride are used in combination with noble metal compounds as a catalyst system in the reaction of nitrobenzene with carbon monoxide, there is little or no formation of phenyl isocyanate.

EXAMPLE 23

The apparatus of Example 19 was employed in this Example. The charge to the autoclave was 129 grams of orthodichlorobenzene, 50 grams of dinitrotoluene (80 parts of 2,4-and 20 parts of 2,6-dinitrotoluene), and a mixture of 5 grams rhodium trichloride, 5 grams palladium dichloride and 15 grams of vanadium pentoxide, the mixture being ground to form a fine powder. The reaction was carried out for 6 hours, during which time the temperature ranged from 188° to 192°C, the pressure was approximately 1,000 psig and the feed rate of carbon monoxide was between 1,000 and 1,500 cc per minute. Analysis of the product showed that there was a conversion of 89 percent of the dinitrotoluene, and a corrected yield of 41.0 percent toluene diisocyanate (a mixture of the 2,4- and 2,6-isomers), 26.5 percent of 2-nitro-4-isocyanato toluene, and 25.7 percent of 4-nitro-2-isocyanato toluene.

What is desired to be secured by Letters Patent is:

1. A process for preparing an aromatic isocyanate which comprises reacting at an elevated temperature and an elevated pressure, an aromatic nitro compound containing up to 20 carbon atoms with carbon monoxide in the presence of a catalyst system, Which comprises employing as said catalyst system a mixture of
   a. a compound selected from the group consisting of palladium halides, rhodium halides, palladium oxides, and rhodium oxides, and b. an oxide of an element selected from the group consisting of vanadium, molybdenum, tungsten, niobium, chromium and tantalum, c. wherein the proportion of said catalyst system is between about 0.1 and about 100 percent by weight of said aromatic nitro compound, and d. wherein sufficient carbon monoxide is present to provide at least three moles of carbon monoxide per mole of nitro groups reacted in said aromatic nitro compound.

2. The process of claim 1 wherein the weight ratio of said compound (a) to said oxide (b) is in the range between about 0:05:1 and 10:1.

3. The process of claim 2 wherein said elevated pressure is in the range between about 100 and 8,000 psig.

4. The process of claim 2 wherein said process is carried out in the presence of an inert solvent selected from the group consisting of halogenated aliphatic hydrocarbons, halogenated aromatic hydrocarbons, and mixtures thereof.

5. The process of claim 2 wherein said elevated temperature is in the range between about 100° and 250°C.

6. The process of claim 2 wherein said aromatic nitro compound is nitrobenzene, dinitrotoluene or isocyanato nitrotoluene.

7. The process of claim 6 wherein said catalyst system is a mixture of palladium chloride and vanadium pentoxide.

8. The process of claim 6 wherein said catalyst system is a mixture of palladium chloride and molybdenum oxide.

9. The process of claim 6 wherein said catalyst system is a mixture of rhodium trichloride and vanadium pentoxide.

10. The process of claim 6 wherein said catalyst system is a mixture of rhodium trichloride and molybdenum oxide.

11. The process of claim 6 wherein said catalyst system is a mixture of rhodium trichloride, palladium chloride and vanadium pentoxide.

12. A process for preparing aromatic isocyanates which comprises reacting an aromatic nitro compound with carbon monoxide in the presence of a catalyst mixture of palladium halides, rhodium halides, palladium oxides or rhodium oxides, and an oxide of molybdenum.

* * * * *